US006975963B2

(12) United States Patent
Hamilton et al.

(10) Patent No.: US 6,975,963 B2
(45) Date of Patent: Dec. 13, 2005

(54) METHOD AND SYSTEM FOR STORING AND REPORTING NETWORK PERFORMANCE METRICS USING HISTOGRAMS

(75) Inventors: David B. Hamilton, Milpitas, CA (US); Louis M. Arquié, Cupertino, CA (US); Kyle C. Lau, San Francisco, CA (US)

(73) Assignee: McData Corporation, Broomfield, CO (US)

(*) Notice: Subject to any disclaimer, the term of this patent is extended or adjusted under 35 U.S.C. 154(b) by 43 days.

(21) Appl. No.: 10/670,983

(22) Filed: Sep. 24, 2003

(65) Prior Publication Data

US 2004/0064293 A1    Apr. 1, 2004

Related U.S. Application Data

(60) Provisional application No. 60/415,003, filed on Sep. 30, 2002.

(51) Int. Cl.[7] .................. G06F 101/14; G06F 11/30
(52) U.S. Cl. .................. 702/182; 702/180; 702/187
(58) Field of Search ................ 702/179, 180, 702/182–188; 340/3.1, 3.3, 3.31, 3.32, 3.6, 340/3.61, 525; 719/43, 47; 369/53.1; 700/17; 345/440

(56) References Cited

U.S. PATENT DOCUMENTS

| | | | |
|---|---|---|---|
| 5,706,436 A | * | 1/1998 | Lewis et al. ............... 709/235 |
| 5,867,483 A | * | 2/1999 | Ennis et al. ................ 370/252 |
| 6,070,190 A | | 5/2000 | Reps et al. |
| 6,108,310 A | | 8/2000 | Wilkinson et al. |
| 6,513,065 B1 | | 1/2003 | Hafez et al. |
| 6,578,077 B1 | | 6/2003 | Rakoshitz et al. |
| 2002/0161755 A1 | * | 10/2002 | Moriarty ........................ 707/4 |
| 2003/0088542 A1 | | 5/2003 | McGee et al. |
| 2003/0126256 A1 | | 7/2003 | Cruickshank, III et al. |
| 2003/0128692 A1 | | 7/2003 | Mitsumori et al. |

* cited by examiner

*Primary Examiner*—Hal Wachsman
*Assistant Examiner*—Manuel L. Barbee
(74) *Attorney, Agent, or Firm*—Hensley Kim & Edgington LLC

(57) ABSTRACT

A method for reporting data network monitoring information. The method includes accessing performance metric values for a network component and generating a trace of graph data points for the performance metric values. For a range of the trace, a histogram is built and displayed corresponding to the graph data points. For a user interface, a performance monitoring display is generated including a graph of the trace relative to an x-axis and a y-axis and a representation of the histogram. The graph data points in the trace corresponds to a histogram previously built from the performance metric values, and the trace is generated by determining and plotting an average value of each of the graph data point histograms. The building of the histogram for the performance monitoring display involves combining the graph data point histograms corresponding to the graph data points in the selected histogram range.

15 Claims, 8 Drawing Sheets

METHOD AND SYSTEM FOR STORING AND REPORTING NETWORK PERFORMANCE METRICS USING HISTOGRAMS

CROSS REFERENCE TO RELATED APPLICATIONS

This application claims the benefit of U.S. Provisional Application No. 60/415,003 filed Sep. 30, 2002, which is incorporated by reference herein in its entirety.

BACKGROUND OF THE INVENTION

1. Field of the Invention

The present invention relates generally to methods and systems for monitoring data storage networks, and more particularly, to a computer-based method and system that utilizes histogram techniques for collecting performance metrics for components of a data network, such as switches, for compressing the collected data to enable maintenance of historical data while substantially retaining measured peaks and valleys in the data (or highs and lows), and for displaying the performance metrics on a single screen or interface that enables network administrators to efficiently monitor network performance in an ongoing and historical manner.

2. Relevant Background

People familiar with the data storage industry realize that data storage networks, including storage area networks (SANs), hold the promise of increasing the availability of data and increasing data access efficiencies and effectiveness while also reducing information technology costs. Generally, a data storage network is a network of interconnected computers, data storage devices, and the interconnection infrastructure that allows data transfer, e.g., optical fibers and wires that allow data to be transmitted and received from a network device along with switches, routers, hubs, and the like for directing data in the network. For example, a typical SAN may utilize an interconnect infrastructure based on Fibre Channel standards that includes connecting cables each with a pair of 1 or 2 gigabit per second capacity optical fibers for transmitting and for receiving data and switches with multiple ports connected to the fibers and processors and applications for managing operation of the switch. SANs also include servers, such as servers running client applications including data base managers and the like, and storage devices that are linked by the interconnect infrastructure. SANs allow data storage and data paths to be shared with all of the data being available to all of the servers and other networked components.

Despite the significant improvements in data storage provided by data storage networks, performance can become degraded in a number of ways. For example, performance may suffer when a network is deployed with few data paths to a storage device relative to the amount of data traffic. Also, performance may be degraded when a data path includes devices, such as switches, connecting cable or fiber, and the like, that are mismatched in terms of throughput capabilities, as performance is reduced to that of the lowest performing device. Further, even if the data paths and devices were originally planned to optimize the bandwidth of each critical data path and of device capabilities within the data paths, changes in usage patterns, such as archiving of data and deployment of new applications, and in network devices may significantly alter performance of the network.

While many performance metrics are measured in a network, an exemplary measurement of performance is utilization, which is typically determined by comparing the throughput capacity of a port of a network device or a data path with the actual or measured throughput at a particular time, e.g., 1.5 gigabits per second measured throughput in a 2 gigabit per second fiber is 75 percent utilization. Hence, an ongoing and challenging task facing network administrators is managing a network so as to avoid underutilization (i.e., wasted throughput capacity) and also to avoid overutilization (i.e., saturization of the capacity of a data path or network device). To properly manage and tune network performance including utilization, monitoring tools are needed for providing performance information for an entire network to a network administrator in a timely and useful manner.

With present monitoring tools, metric information such as utilization of a switch or traffic on a data path is collected and stored. A user interface may then be used to display real time data as it is collected. A graph may show a metric relative to time as the data is being gathered. However, because the administrator cannot view the screen continuously, it is likely that the administrator will not be able to identify problems within the network, such as saturation or underutilization of a portion of the network. Some monitoring tools allow thresholds to be set to provide alarm messages when the monitored network parameter or meter exceeds a minimum or maximum value. However, this only provides information on discrete peaks and/or valleys of performance information but does not provide useful trending or historical information.

Network administrators generally demand that monitoring tools provide data collection and reporting that provides historical information that can than be used to identify ongoing or periodic performance trends. For example, an administrator may wish to know that a system or portion of a system was being over utilized repeatedly at a certain time of day which may indicate data backup or some other repeated activity was overloading the systems equipment. Historical data is also useful for trending and tuning a system and for planning for equipment upgrades as trends can be identified such as one portion of a data storage system or network is being used more and more with time, which indicates that an upgrade or tuning may soon be necessary to control saturation problems.

A number of problems are associated with collecting, storing, and accessing historical data. One problem involves the amount of memory that is required for storing collected performance information for a data network. Assuming a single port is being monitored on a 30 second polling schedule, every hour 120 data points would be collected and if each data point required about 80 bytes of memory 9.6 Kbytes would be needed for each port. The problem quickly multiplies as data is collected over days, weeks, and months for hundreds or thousands of ports in a network. Hence, there is a need for reducing the memory capacity required to store historical data on network performance. Some existing tools use averaging of collected data but this often results in important information being hidden from the administrator. Specifically, a data network becomes inefficient if it operates at high over utilization or saturation and/or operates with little utilization or under utilization. However, if a high metric value is averaged with a low metric value, the result is very misleading. For example, a utilization rate of 95 percent averaged with a utilization of 5 percent would indicate utilization of 50 percent. While 50 percent utilization may be acceptable to an administrator, it is doubtful that periods of saturated operation would be acceptable as this would result in reduced efficiency. Other reporting tools simply provide large spreadsheets or reports of historical data, which is also often not useful to an administrator as the data is not correlated and/or is so overwhelming in size that important information is difficult to identify and understand.

Hence, there remains a need for methods and systems for collecting, storing, and reporting real time and historical performance information for data storage networks to network administrators. Such as system preferably would be useful for viewing information on a standard monitor screen such as in a graphical user interface and would be relatively easy to use and understand, i.e., not require significant administrator training. Additionally, such a method and system would preferably retain historical data without losing or hiding high and low values that can be caused by value averaging and would require less memory to store historical information.

SUMMARY OF THE INVENTION

The present invention addresses the above problems by providing network monitoring system that provides the dual functions of storing performance information for a network in a more compressed and useful configuration and of creating and displaying reports or graphical displays of the gathered performance information. Generally, the network monitoring system functions to collect performance data for a data network and determine performance metrics. The performance metrics are periodically stored in the form of histograms built from the gathered data and/or metrics, which can then be periodically deleted or erased from memory as duplicative. In some embodiments, the stored histograms are then used to create additional histograms with more granularity by combining several of these lower level histograms into a higher-level histogram. Such data compression can be repeated to form multiple levels of histograms of varying granularity, such as histograms corresponding to 5 to 15 minute intervals, half hour intervals, 2 hour intervals, 1 day intervals, 1 month intervals, or other useful time intervals of increasing length or size.

The reporting function involves displaying a real time graph of collected performance information and/or metrics and then, upon request, building a histogram based on the real time information. In more preferred embodiments, the period being monitored is more historic such as 1 day, 1 week, 1 month, and the like. In these cases, a first graphical representation is created and displayed in a user interface that includes a trace of a set of data points relative to an x-axis and a y-axis (such as metric value versus time). Each of the data points is an average of a histogram stored in memory for the monitored network component (as discussed above regarding data compression). A second graphical representation is provided, typically adjacent the first representation, that illustrates a histogram for a histogram range indicated in the first graphical representation, i.e., defining a subset of the data points for use in the histogram. Note, however, that the histogram is not merely a collection of the data point values but is instead a collection of the histograms corresponding to the data points and stored in memory. In this manner, a truer representation of the performance of the monitored component is obtained as the histogram in the second graphical representation includes high and low (or peak and valley) values of the performance metric that otherwise might be lost or hidden with simple averaging techniques.

More particularly, a computer-based method is provided for reporting data network monitoring information. The method includes accessing a set of performance metric values for a network component and generating a trace comprising graph data points based on the performance metric values. The method further includes for a selected histogram range of the trace, building a histogram corresponding to the graph data points. For a user interface, a performance monitoring display is generated including a graph of the trace relative to an x-axis and a y-axis and a representation of the histogram. The performance metric values are values discovered for the network component or derived from the discovered values. The y-axis of the graphed trace may include ranges of values for the performance metric values, and the building of the histogram may include reusing the ranges of values as metric value ranges for the histogram. In one embodiment, the histogram and the trace graph are adjacent with the x-axis of the histogram being parallel to the y-axis of the trace graph. In the user interface, a selection mechanism is preferably displayed that is movable by a user of the user interface to define the selected histogram range. In some embodiments, each of the graph data points in the trace corresponds to a histogram built from the performance metric values and the trace is generated by determining and plotting an average value of each of the graph data point histograms. In such embodiments, the building of the histogram for the performance monitoring display includes combining the graph data point histograms corresponding to the graph data points in the selected histogram range.

DETAILED DESCRIPTION OF THE PREFERRED EMBODIMENTS

The present invention is directed to an improved method, and associated computer-based systems, for storing and reporting performance information or performance metrics for a data network. The following description stresses the use of the invention for monitoring and reporting metrics for data storage networks, such as storage area networks (SANs) and network area storage (NAS) systems, but is useful for monitoring operating performance of any data communication network in which data is transmitted digitally among networked components.

Generally and briefly, the invention involves collecting performance information from a data network, calculating performance metric values, and storing the data in a compressed manner. Data compression is performed by storing the metric values in a number of histograms at various levels or at points in time. In other words, the performance metrics are determined and stored in real time but also periodically formed into histograms corresponding to various levels or points in time, such as first level histograms corresponding to 5 to 15 minute intervals, second level histograms corresponding to half hour to hour intervals, third level histograms corresponding to 2 hour intervals, and so on to allow data to be stored with decreasing granularity while still maintaining low and high values for the metrics (i.e., to not average out extreme values and to only sacrifice a small amount of resolution at the high and low values). The unique reporting features of the invention involve presenting histograms on a network administrator user interface or monitor concurrently with performance metric information, such as a typical trace graph of metric value versus time for a network device, such as a switch port. Typically, the user interface includes a range selector mechanism, such as minimum and maximum selection bars, and a histogram is generated based on these (or default) range settings. The histogram is then displayed in the user interface allowing the administrator to identify high and low data points for the metrics rather than just average values that may hide peaks and valleys. In one embodiment, the histogram is displayed adjacent to the more standard metric graph so as to share an axis or axes with the metric graph to control the screen real estate required for the histogram and to effectively relate the histogram to corresponding data points in the metric graph.

Figure 1:
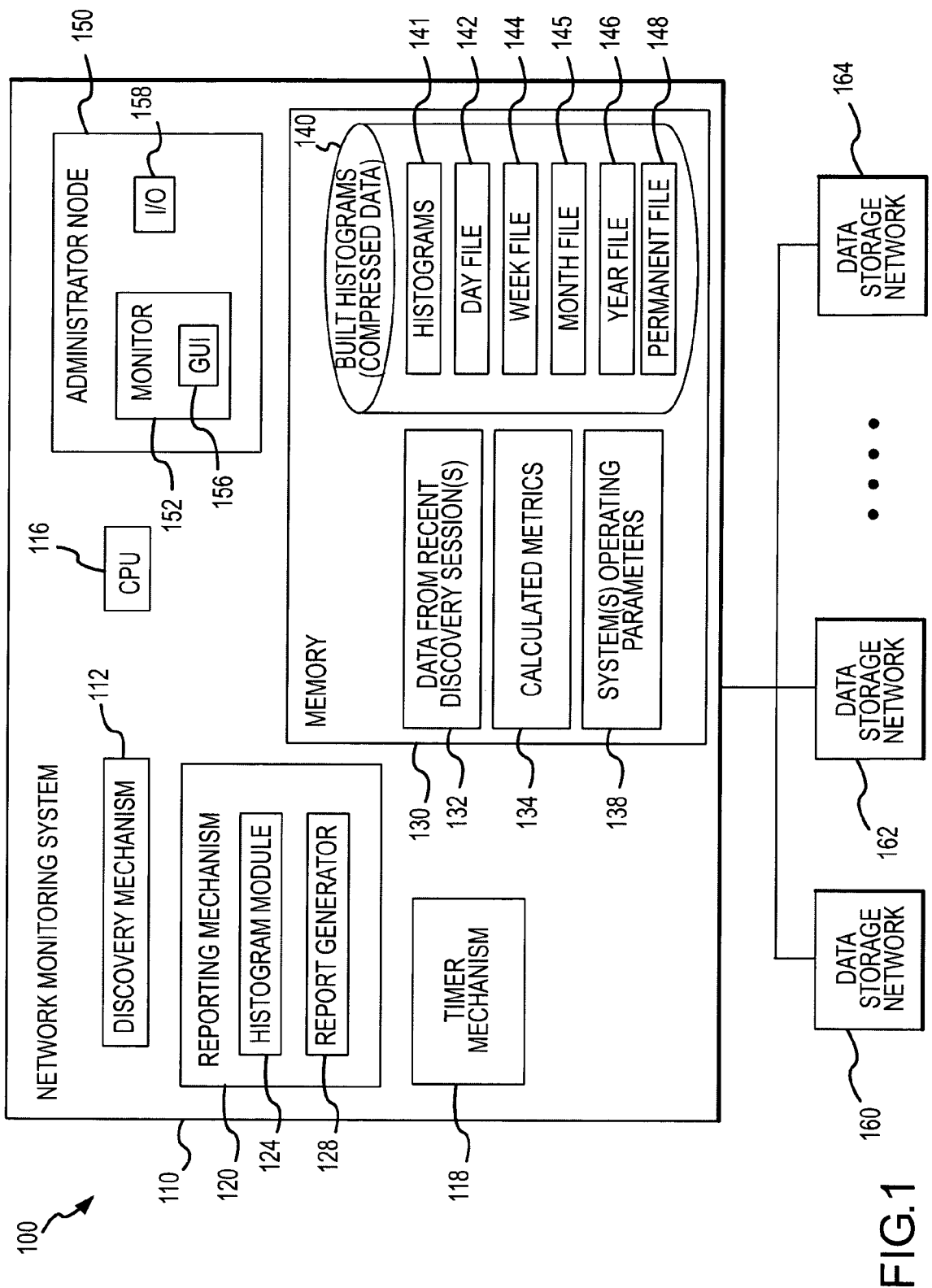
FIG. 1 is a simplified block diagram of a performance reporting system according to the present invention including a reporting mechanism for collecting and storing performance metrics in a compressed manner and for displaying performance reports including user selectable histograms.

These and other aspects of the present invention will become clear with the following description, which begins with a description of an exemplary performance reporting system with reference to FIG. 1. The system shown in FIG. 1 implements components, including a reporting mechanism with a histogram module and a report generator, that are useful for determining performance metrics, for compressing and storing historic metric data (i.e., as histograms), and also generating displays or reports that include the stored metric information and histograms (either previously generated and stored or newly formed in response to a histogram range selection entered by an administrator via a user interface). The description continues with a discussion of general operations of the network monitoring system of the performance reporting system, and particularly, the histogram module with reference to the flow chart of FIG. 2 and the data compression method shown in simplified fashion in FIG. 3. Operation of the report generator is described in detail with reference to the flow chart of FIG. 4 with specific reports or displays that are generated being shown in FIGS. 5–8.

FIG. 1 illustrates one embodiment of a performance reporting system 100 according to the invention. In the following discussion, computer and network devices, such as the software and hardware devices within the system 100, are described in relation to their function rather than as being limited to particular electronic devices and computer architectures and programming languages. To practice the invention, the computer and network devices may be any devices useful for providing the described functions, including well-known data processing and communication devices and systems, such as application, database, and web servers, mainframes, personal computers and computing devices (and, in some cases, even mobile computing and electronic devices) with processing, memory, and input/output components, and server devices configured to maintain and then transmit digital data over a communications network. The data storage networks 160, 162, 164 may be any network in which storage is made available to networked computing devices such as client systems and servers and typically may be a SAN, a NAS system, and the like and includes connection infrastructure that is usually standards-based, such as based on the Fibre Channel standard, and includes optical fiber (such as 1 to 2 gigabit/second capacity fiber) for transmit and receive channels, switches, routers, hubs, bridges, and the like.

The administrator node(s) 150 and network monitoring system 110 running the discover mechanism 112 and the reporting mechanism 120 may be any computer device useful for running software applications including personal computing devices such as servers, mainframes, desktops, laptops, notebooks, and even handheld devices that communicate with a wired and/or wireless communication network. Data, including discovered network information, performance data, and generated reports or displays and transmissions to and from the elements of the system 100 and among other components of the system 100 typically is communicated in digital format following standard communication and transfer protocols, such as TCP/IP, HTTP, HTTPS, FTP, and the like, or IP or non-IP wireless communication protocols such as TCP/IP, TL/PDC-P, and the like.

Referring again to FIG. 1, the system 100 includes a network monitoring system 110, which may include one or more processors 116 for running the discovery mechanism 112 and the reporting mechanism 120 and for controlling operation of the memory 130. The network monitoring system 110 is shown as one system but may readily be divided into multiple computer devices. For example, the discovery mechanism 112, reporting mechanism 120 (and even the histogram module 124 and report generator 128 of the mechanism 120), memory 130 and administrator node 150 may each be provided on separate computer devices or systems that are linked (such as with the Internet, a LAN, a WAN, or direct communication links) or are otherwise able to share data (such as by exchanging data storage devices such as disks).

The network monitoring system 110 is linked to networks 160, 162, 164 (with only three networks being shown for simplicity but the invention is useful for monitoring any number of networks such as 1 to 1000 or more). The networks 160, 162, 164 may take many forms to practice the invention. For example but not as a limitation, the networks 160, 162, 164 may be SANs that include numerous servers or other computing devices or systems that run applications which require data which is stored in a plurality of storage devices (such as tape drives, disk drives, and the like) all of which are linked by an often complicated network of communication cables (such as cables with a transmit and a receive channel provided by optical fiber) and digital data communication devices (such as multi-port switches, hubs, routers, and bridges well-known in the arts).

The memory 130 is provided to store discovered data from the networks 160, 162, 164, real time performance metrics that are discovered or calculated, and compressed data for use in storing historic performance data. For example, but not as a limitation, the memory 130 stores data from a recent discovery session or sessions 132 which may include data traffic, switch counter values, and other information that is typically collected in polling sessions with data network devices. The memory 130 further stores system (s) operating parameters 138 that may be used for calculating operating parameters or performance metrics and such information may include data flow capacities useful for determining utilization. Metrics 134 calculated by the reporting mechanism 120 are also stored in memory 130, and are discussed in more detail with reference to FIG. 2 as part of discussing operation of the reporting mechanism 120.

In some preferred embodiments, the recently discovered data 132 and calculated metrics 134 are stored for some predetermined amount of time and then purged to limit the amount of memory 130 dedicated to storing performance information, e.g., the raw discovery and calculated metrics 132, 134 may be stored in a RAM portion of memory 130 for 0.5 to 3 hours or more, and in one embodiment, 1 hour to support creation of real time graphs of performance data for a relatively short period of time. Significantly, memory 130 also stores compressed data 140 in the form of histograms built by histogram module 124. Storage of performance data can require large amounts of memory 130 especially for large or multiple networks in which it is desired to retain performance information for months or years. To address this problem, memory 130 is only used to store data compressed in histograms for recent data (such as 15 minute intervals but larger amounts of data, such as every 30 minutes, 60 minutes, 120 minutes, and the like, can be stored if it is desired to limit the compression of monitoring data) and then, for various levels or time periods, such as a day file 142, a week file 144, a month file 145, a year file 146, and a "permanent" file 148 with the granularity increasing for each of these files. The creation of these files is discussed in detail below with reference to FIGS. 2 and 3.

The administrator node 150 is provided to allow a network administrator or other user to view performance reports or displays created by the reporting mechanism 120 (as shown in FIGS. 5–8). In this regard, the administrator node 150 includes a monitor 152 with a graphical user interface 156 through which a user of the node 150 can view and interact with created and generated reports and/or displays. Further, an input and output device 158, such as a mouse, touch screen, keyboard, voice activation software, and the like, is provided for allowing a user of the node 150 to input information, such as requesting a performance monitoring display or manipulation of such a display as discussed with reference to FIGS. 5–8.

Initially (and periodically), the discovery mechanism 112 functions to obtain the topology information or physical layout of the monitored data storage networks 160, 162, 164 and to store such information in an asset management database (not shown). The discovered information in the database includes listing of the devices in the networks 160, 162, 164. The discovered information in the database typically includes throughput capacities, such as maximum bandwidths which in some cases can vary for a single device, i.e., bandwidths may vary port to port on a single switch, for the devices (as appropriate depending on the particular device) that are stored as system operating parameters 138 in memory 130. The discovery mechanism 112 may take any of a number of forms that are available and known in the information technology industry as long as it is capable of discovering the network topology of the fabric or network 160, 162, 164. Typically, the discovery mechanism 112 is useful for obtaining a view of the entire fabric or network 160, 162, 164 from HBAs to storage arrays including IP gateways and connection infrastructure.

The discovery mechanism 112 functions on a more ongoing basis to capture periodically (such as every 2 minutes or less) performance information 132 from monitored data storage networks 160, 162, 164. For example, the mechanism 112 typically acts to retrieve measured traffic 132 from the networks 160, 162, 164 (or determines such traffic by obtaining switch counter information and calculating traffic by comparing a recent counter value with a prior counter value, in which case the polling or retrieval period is preferably less than the time in which a counter may roll over more than once to avoid miscalculations of traffic). In one embodiment of the invention, the performance information (including the traffic) 132 is captured from network switches using Simple Network Management Protocol (SNMP) but, of course, other protocols and techniques may be used to collect his information. In practice, the information collected by each switch in a network 160, 162, 164 may be pushed at every discovery cycle (i.e., the data is sent without being requested by the discovery mechanism 112). A performance model including measured traffic is sometimes stored in memory 130 at 132 to keep the pushed data for each switch.

The reporting mechanism 120 functions to determine performance metrics 134 that are later reported and/or displayed in a network monitoring or performance reporting display in the GUI 156 on monitor 150 (as shown in FIGS. 5–8 and discussed more fully with reference to FIG. 4). In preferred embodiments, one performance parameter calculated and displayed is utilization or utilization rate 134 that is determined using a most recently calculated or measured traffic value 132 relative to a rated or throughput capacity 138. For example, the measured (or determined from two counter values of a switch port) traffic 132 may be 1 gigabit of data/second and the throughput capacity for the device, e.g., a connection or communication channel, may be 2 gigabits of data/second. In this case, the calculated utilization 134 would be 50 percent. The reporting mechanism 120 acts to calculate such information 134 for each device in a network 160, 162, 164. This information is then utilized as discussed below by the histogram module for compressing collected performance data for storage at 140 in memory 130 and by the report generator 128 which utilizes both the calculated metrics 134, which are typically substantially real time, and the built histograms 140 to create reports and displays of the performance of a network for use by an operator of the administrator node 150. A timer mechanism 118 is included in the network monitoring system 112 for use by the discovery mechanism 112 in determining polling session frequency and for use by the histogram module 124 in determining when to generate additional histograms 140 and to purge stale portions of memory 130 (such as discovered data 132 and calculated metrics 134 that are no longer needed for displaying performance reports/graphs and histograms 140 that are not needed to form additional historic histograms as will become more clear from the following discussion). In some embodiments, a circular buffer(s) utilized such that stale or unneeded portions of memory 130 are automatically overwritten or purged.

Figure 2:
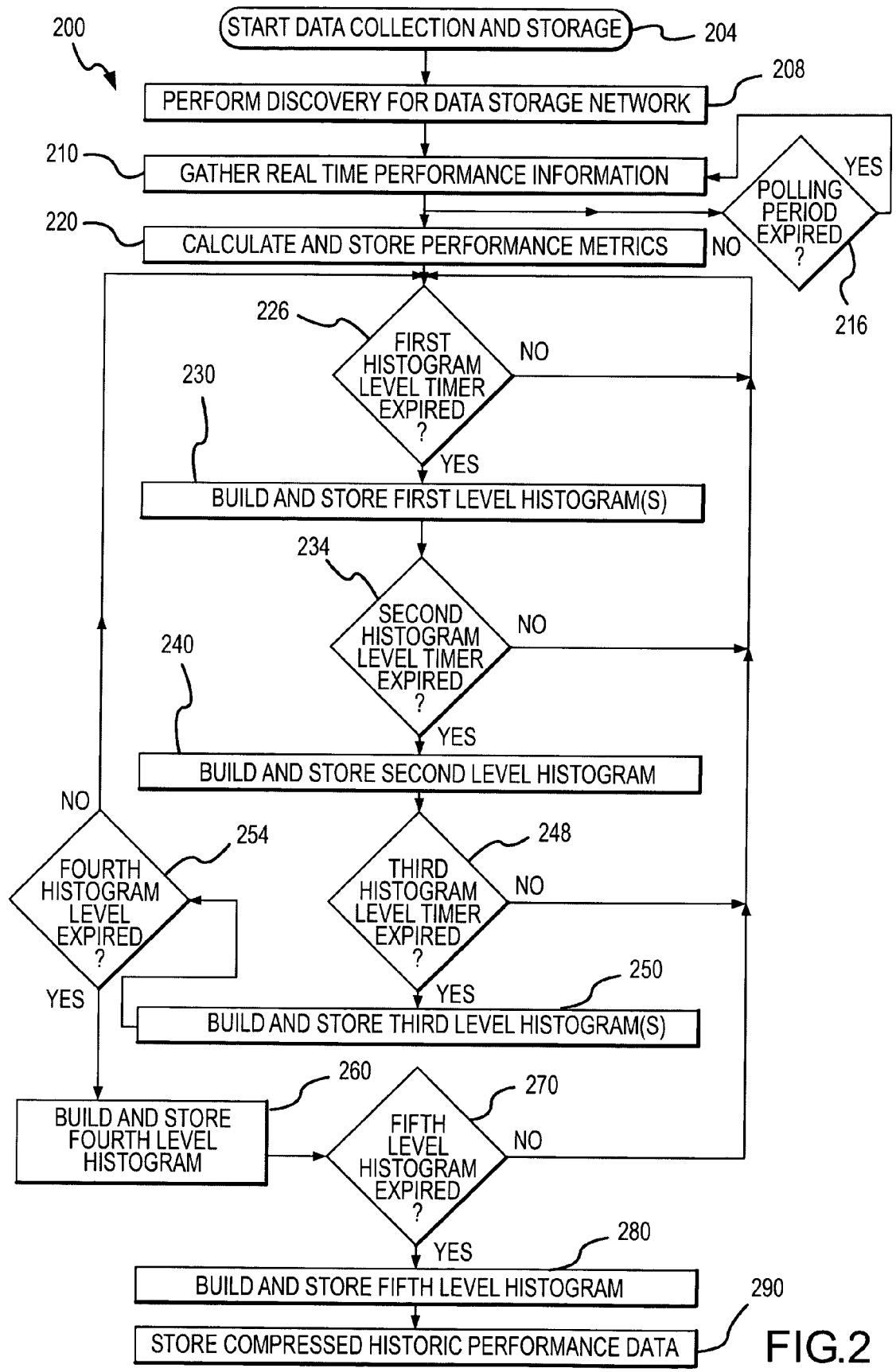
FIG. 2 is a flow chart illustrating in a general manner operation of the histogram module of the reporting mechanism of FIG. 1.
Figure 4:
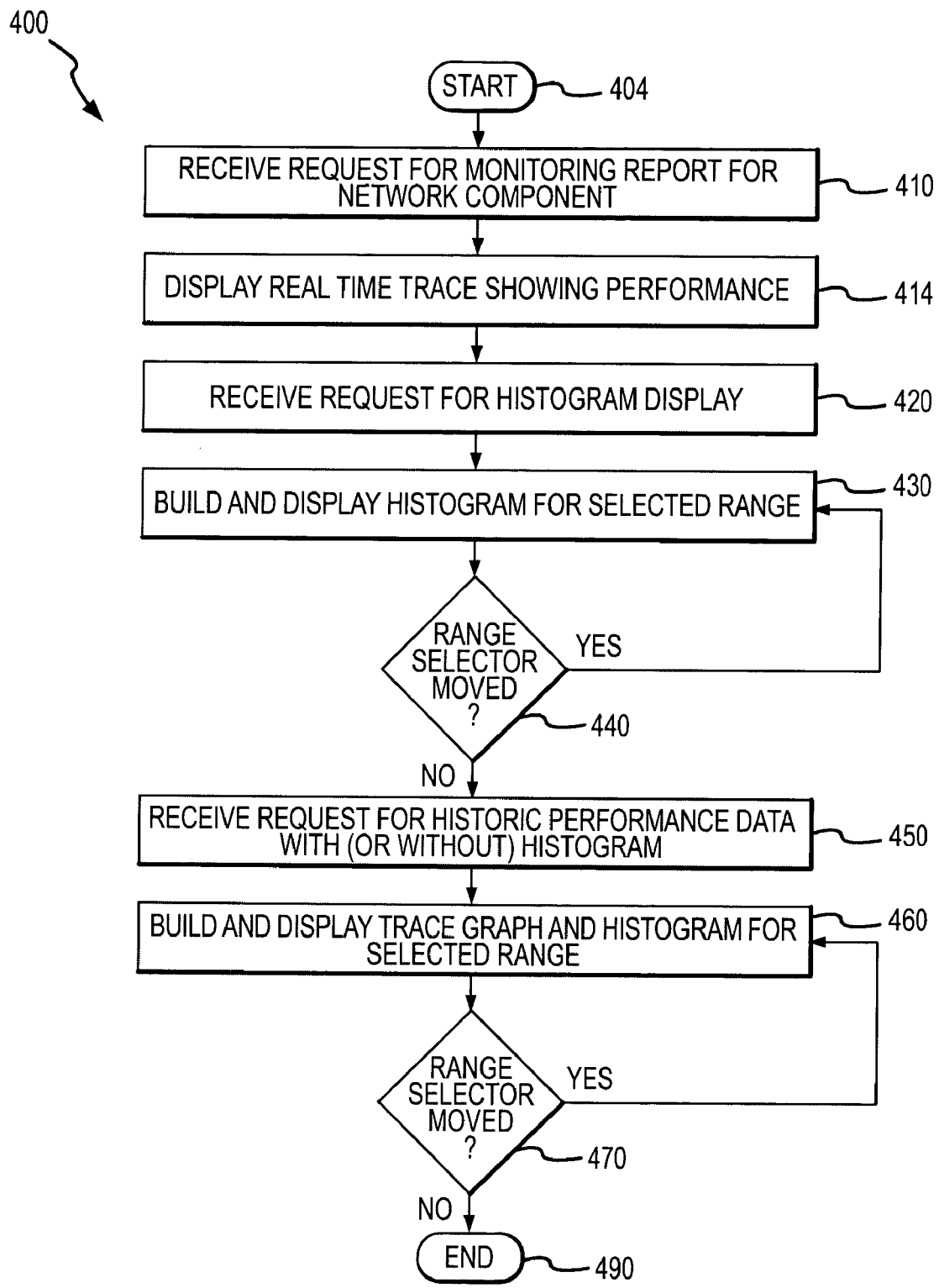
FIG. 4 is a flow chart illustrating exemplary functions provided by the network monitoring system of FIG. 1 and in particular, the report generator.

The operation of the network monitoring system 110 and, particularly, the reporting mechanism 120 are described in further detail in the data collection and storage process 200 shown in FIG. 2 and reporting process 400 shown in FIG. 4. Referring first to FIG. 2, the monitoring process 200 starts at 204 typically with the loading of discovery mechanism 112 and reporting mechanism 120 on system 110 and establishing communication links with the administrator node 158 and data storage networks 160, 162, 164 (and if necessary, with memory 130). At 208, discovery is performed with the mechanism 112 for one or more of the data storage networks 160, 162, 164 to determine the topology of the network and system operating parameters, such as capacity ratings, 138 are stored in memory 130. In some embodiments, such discovery information is provided by a module or device outside the system 110 and is simply processed and stored by the reporting mechanism 120.

At 210, the discovery mechanism 112 acts in conjunction with elements of the networks 160, 162, 164 to gather real time performance information 132 that is stored in memory 130. The type of information collected may vary with the network configurations, the components of the network, and the performance being monitored by the system 110. For example, it may be desirable to monitor such performance parameters or metrics such as utilization (typically measured as a percentage of capacity) of transmit or receive channels or connection and/or response (typically measured in units of time such as milliseconds). Additional metrics or parameters that may be measured or calculated include current or real time traffic (e.g., bits per second (bps) in a connection), average or real time packets per second, packet size, network latency, errors and discards, percentage packet loss, and other parameters useful for determining performance of a network. It should be understood that the invention is not limited to monitoring and reporting particular network performance information or metrics but instead, the ideas described herein are applicable to a very wide range of performance information collection and reporting.

The discovery mechanism 112 acts to poll (or to receive pushed information from) the monitored networks periodically, such as every 2 minutes or another polling period. To this end, the method 200 shows a determination at 216 if the polling period has expired, which typically involves using timer mechanism 118 to compare polling counters with a clock. When the polling period expires at 216, the gathering of performance information at 210 is repeated. The data 132 stored in memory 130 is updated to include the recently gathered data. In some embodiments, only a limited amount of real time or recent data is stored at 132 and more stale information is deleted as new information is gathered 210. For example, in some cases, one hour of recent data is stored at 132 to facilitate reporting with the report generator 128 real time and recent data for the networks 160, 162, 164 (but of course a shorter or longer period of time may be used and corresponding information may be stored at 132).

The length of the real time or recent period is generally kept relatively short (such as in an hour to a few hours or more) to control the amount of memory 130 required to store the data 132 as typically performance information is gathered for numerous devices within each network 160, 162, 164 may be quite large (e.g., data may be gathered for each connection and port for a network that has hundreds to thousands of connections or data paths and hundreds to thousands of ports). At 220, the reporting mechanism 120 acts to calculate and store performance metrics 134, such as percentage utilization and the like, and may use the histogram module 124 or another module (not shown) to complete this task. As with the gathering process 210, the metrics 134 are periodically updated (such as once for every polling session of discovery mechanism 112) such that real time or recent data can be displayed or reported by the report generator 128 (see process 400 of FIG. 4).

An important aspect of the invention is storing historic performance data in a more compact or compressed manner. This is achieved by storing data in a number of levels corresponding to the age or staleness of the data. At each of these levels, one or more histograms 141 are built to represent the collected and calculated data points 132, 134 in a compressed fashion for storage in memory 130 at structure 140. Significantly, the use of histograms 141 rather than simple averaging allows representations of a wider spectrum of metric values 134 to be illustrated even in historic reports or graphs with lower granularities, which reduces the risk that unacceptably high or low values will be lost or hidden from a network administrator.

For example, in one embodiment, every 15 minutes, all data points for a particular metric and device (such as percentage utilization for a port) are collected and used to build a histogram representing that 15-minute period or level. Then, when a next level timer expires, such as every half hour, histograms are built using the prior level histograms, such as by combining two previous 15-minute histograms. In this manner, the next level histograms are formed by combining the values within each histogram "bucket" so as to further compact the data by creating a single histogram from two or more prior or lower histogram levels. This is repeated at each level, such as by combining the half hour histograms to form 2-hour histograms, by then combining 2-hour histograms to form day histograms, and then by combining day histograms to form month histograms. The various levels of histograms 141 can then be stored in files that allow graphs of historic data to be quickly created and provided to an administrator, such as day, week, month, year, and permanent files as shown in FIG. 1 at 142, 144, 145, 146, 148.

This data compression is shown in simplified fashion in FIG. 2 in steps 226-290. As shown, at 226, the histogram module 124 acts to determine if a first level timer has expired (e.g., if a discovery polling period is set at 2 minutes or less it may be useful to begin to build histograms every 4 to 20 minutes or more, and in one case, the polling session is set at about 1.5 minutes and the first level histogram timer is set at 15 minutes to build a histogram with 10 data points for a metric and in another case, 10 data points are collected for each low or first level histogram by setting the polling session period at 0.5 minutes and the first level histogram timer at 5 minutes) and if not, rechecking the timer 118 at 226. Note, the building of the histogram generally occurs at a set point in time regardless of the number of data points collected. So, in the above example, histograms may be built at 15 minutes with polling being done more frequently to gather more than 10 data points or less frequently to gather fewer data points. If expired, then at 230, the histogram module 124 functions to build a histogram for one or more of the metrics 134 being monitored by the system 110 (such as utilization, response, and the like) and for one or more (and typically, every) component or device being monitored in the networks 160, 162, 164.

The histograms may take a number of forms but are generally configured to include a number of "buckets" or sections that correspond to a range of values for the metric. For example, a histogram for a percent utilization may include 10 buckets corresponding to 10 percent increments from 0 to 100 percent (of course, the number of buckets or histogram divisions may be smaller or larger to practice the invention). Then, in step 230, each data point would be placed in one of these histogram buckets, and this compresses data as a single numeric value (e.g., a percentage value or a number corresponding to a particular bucket to indicate a data point is placed in a bucket) can be stored for each data point along with a time value indicating when the data points were collected or discovered. This significantly reduces the memory required as the data point or calculated metric requires much more memory (up to 80 bytes or more for each collected data point or calculated metric). The built histogram is then stored at 141 in memory 130 for later use by the report generator 128. Although not shown in FIG. 2, the process 200 includes deleting data 132 and metrics 134 that are stale, i.e., outside the largest time period utilized by the report generator in producing real time graphs. In one embodiment, data is stored at 132, 134 for 1 hour in RAM portion of memory 130, and when the data becomes more than 1 hour old it is deleted or written over with new performance information. Of course, shorter or longer "real time" data periods may be used in practicing the invention with longer periods requiring larger portions of memory 130.

At 234, the histogram module 124 determines if a second histogram level timer or period has expired. If not, control is returned to step 226, and at this point, it may be useful to understand that it is typically preferable that higher level time periods be made of whole numbers of lower levels (i.e., 5 or 15 minute first level time periods can be divided easily into second level time periods of one half hour or one hour). When the histogram module determines (e.g., with interaction with timer mechanism 118) that the period has expired, a second level histogram is built and stored at 240 in memory 141. In one embodiment, the second level timer or time period is set at one half hour, and every half hour a new histogram (i.e., a second level histogram) is formed using the most recent first level histograms. For example, if the first level histograms are formed every 15 minutes then 2 of these histograms are combined by adding the number of data points in each bucket to create new single numeric bucket values the second level histogram (if 5 minute intervals are used then 6 of these histograms are combined to form the new second level histogram).

Similar processes are repeated at steps 248 through 280 to build and store third through fifth level histograms. For example, a third level timer may be set at 2 hours such that four of the half hour or second level histograms are combined to form the third level histograms. The fourth level timer may be set at 24 hours or one day with step 260 being performed by combining 12 of the 2-hour histograms. The fifth level timer may be set at one month with the fifth level histograms comprising the day histograms from the fourth level for that particular month. In some cases, the built histograms 141 are stored permanently, and in other cases, the built histograms 141 are periodically deleted to make room for newly built histograms.

As shown, at 290, the built histograms 141 are formed into one or more historic data file. As shown in the embodiment of FIG. 1, these files may include a day file 142, a week file 144, a month file 145, a year file 146, and a permanent file 148. The day file 142 is formed for each day that monitoring is performed by the system 110, and includes for each day a plurality of the first level histograms, such as 48 histograms for when the first level timer is set at 15 minutes or 144 if set at 5 minutes. The week file 144 typically includes the set of second level histograms built for each week monitoring is performed, e.g., the half hour histograms which results in a collection of 336 histograms. In the month file 145, the third level histograms 141 for each month are collected and stored in memory 130, e.g., with 2-hour third level settings, the month file 145 would include 360 histograms. In the year file 146, the fourth level histograms 141 are collected for each monitoring year, e.g., with the day setting for the fourth level, this would result in 365 histograms being stored. In the permanent file 148, the fifth level histograms 141 are collected and stored, e.g., for the one-month fifth level setting this would result in 12 histograms being stored per year for each monitored component or device. The process 200 can readily be modified by including fewer or greater numbers of histogram levels and fewer or greater historic performance data files 142, 144, 145, 146, 148.

Figure 3:
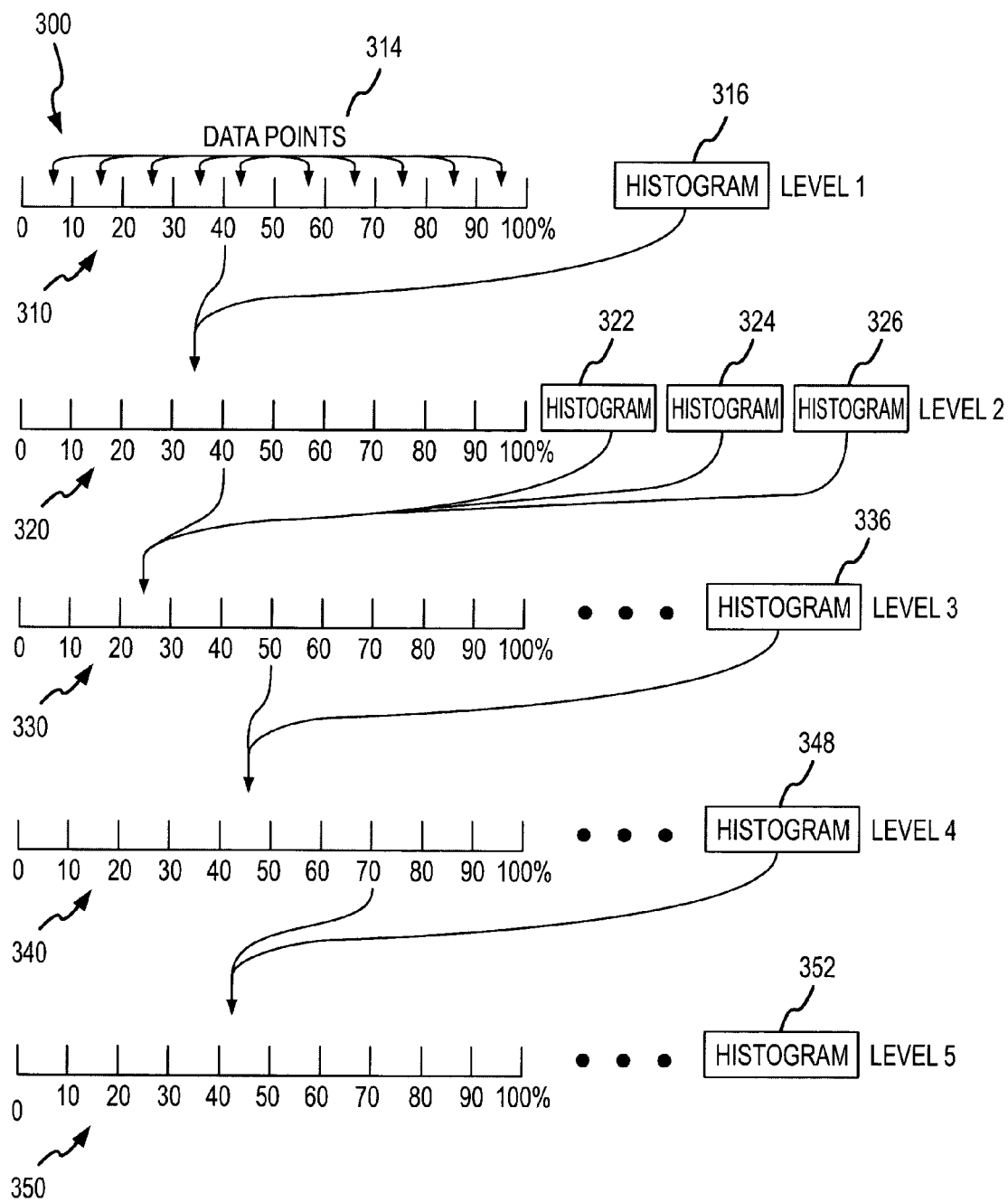
FIG. 3 is a schematic showing the use of various levels of histograms to compress performance data to control data storage while retaining low and high values.

The compression technique shown as part of process 200 is shown in more detail in FIG. 3. As shown, data compression using histograms 300 includes first collecting data points 314, such as values for a specific metric, and placing them in the buckets of a first level histogram 310. As shown, the histogram 310 is configured to have 10 buckets or metric value ranges (but more or less may readily be utilized to practice the invention). So, for example, data points 314 for a percent utilization may indicate that a port or other device was between 20 and 30 percent utilization 4 times during the first level period (such as 5 or 15 minutes or the like), between 50 and 60 percent 4 times, and between 90 and 100 percent (or near saturation) 2 times. These three numeric values would be placed in the appropriate buckets or metric value ranges for the histogram, and the histogram 310 would be stored in memory. Note, if averaging were instead used to compress the data these 10 data points would provide an average utilization of about 50 percent, which would not provide a true or accurate picture of the utilization at this port, whose usage may need to be tuned to reduce the time spent at or near saturation. Histogram 316 is built in a similar fashion for a different time period and stored in memory.

The second level histograms 320, 322, 324, 326 are formed by combining two or more of the first level histograms 310, 316, i.e., adding the numeric values in similar buckets or metric value ranges of two or more histograms. As shown, the two first level histograms 310, 316 are combined to form the second level histogram 320, with histograms 322, 324, 326 being formed in a similar fashion with other first level histograms (not shown). For example, the second level histograms may be built every half hour, and as such, are built by combining two, 15-minute histograms 310, 316. The third level histograms 330, 336 are then formed by combining two or more of the second level histograms, such as by combining four second level histograms 320, 322, 324, 326 as would be the case when third level histogram 330 is formed every 2 hours and the second level histograms 320, 322, 324, 326 are formed every half hour. Similarly, the fourth level histograms 340, 348 are formed by combining 2 or more of the third level histograms 330, 336. For example, if the fourth level histograms 340, 348 are formed one a day, then the histograms 340, 348 would be formed by combining 12 of the third level histograms 330, 336. The fifth level histograms 350, 352 are formed by combining two or more of the fourth level histograms 340, 348. For example, if the fifth level histograms 350, 352 are formed every month, the histograms 350, 352 would be formed by combining the day histograms 340, 348 from the fourth level corresponding to the particular month being monitored.

FIG. 4 illustrates a reporting process 400 that builds on the collected data 132, the determined metrics 134, and the histograms 140 to quickly and effectively display performance information to a user of the administrator node 150. The method 400 is generally performed by the report generator 128 and starts at 404 with the loading and initiation of the report generator 128, and may include establishing an initial user interface 156 at the administrator node 150 for allowing a user or administrator to request monitoring reports or performance reports for one or more networks 160, 162, 164 and for particular components, such as connections, ports, and the like, within such networks. At 410, the report generator 128 receives a request for a monitoring report for a network component.

Figure 5:
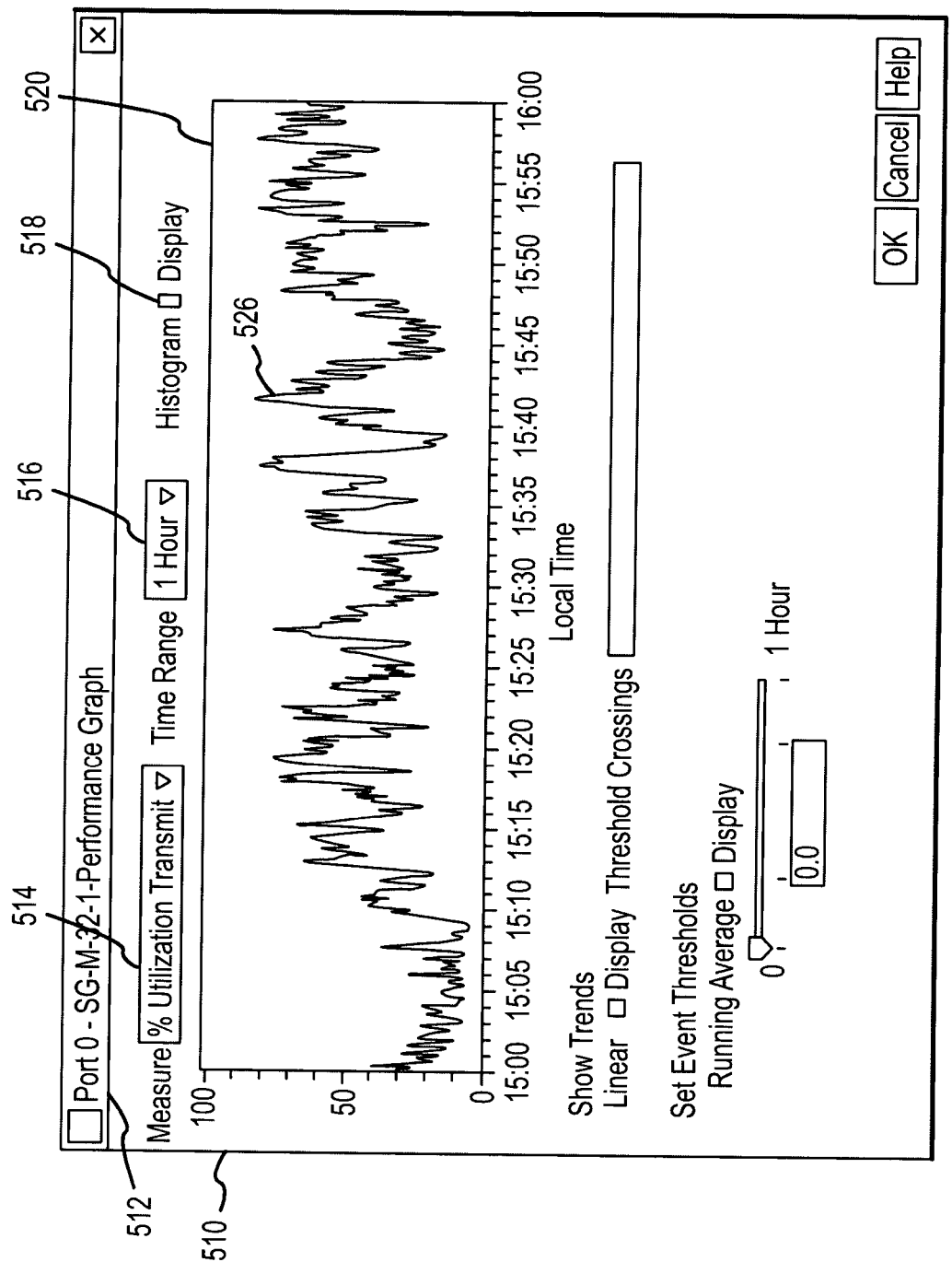
FIG. 5 illustrates one embodiment of a performance reporting display used by the report generator to display real time information for a relatively short period of time.

Initially, at 414, the report generator 128 responds to such request by creating a user interface 156 that typically will include the real time data and/or calculated metric(s) for that network component. FIG. 5 displays a screen 510 of one exemplary user interface 156 that can be created by the report generator 128 to include a report display or performance graph 520 with a trace 526 indicating the performance of the network component (indicated at 512 as a port) for a particular period of time. As shown, the time range being reported in the graph 520 is for the last hour, and as shown at 516, this time can be selected. The trace 526 is updated each discovery cycle with new data or metrics 132, 134, and typically, includes a data point or calculated metric for each point in the trace 526. The parameter or metric being reported is selectable with pull down menu 514, with the illustrated report 520 being for the percent utilization performance metric. At 518, the user can request that a histogram be displayed for the reported performance information.

Figure 6:
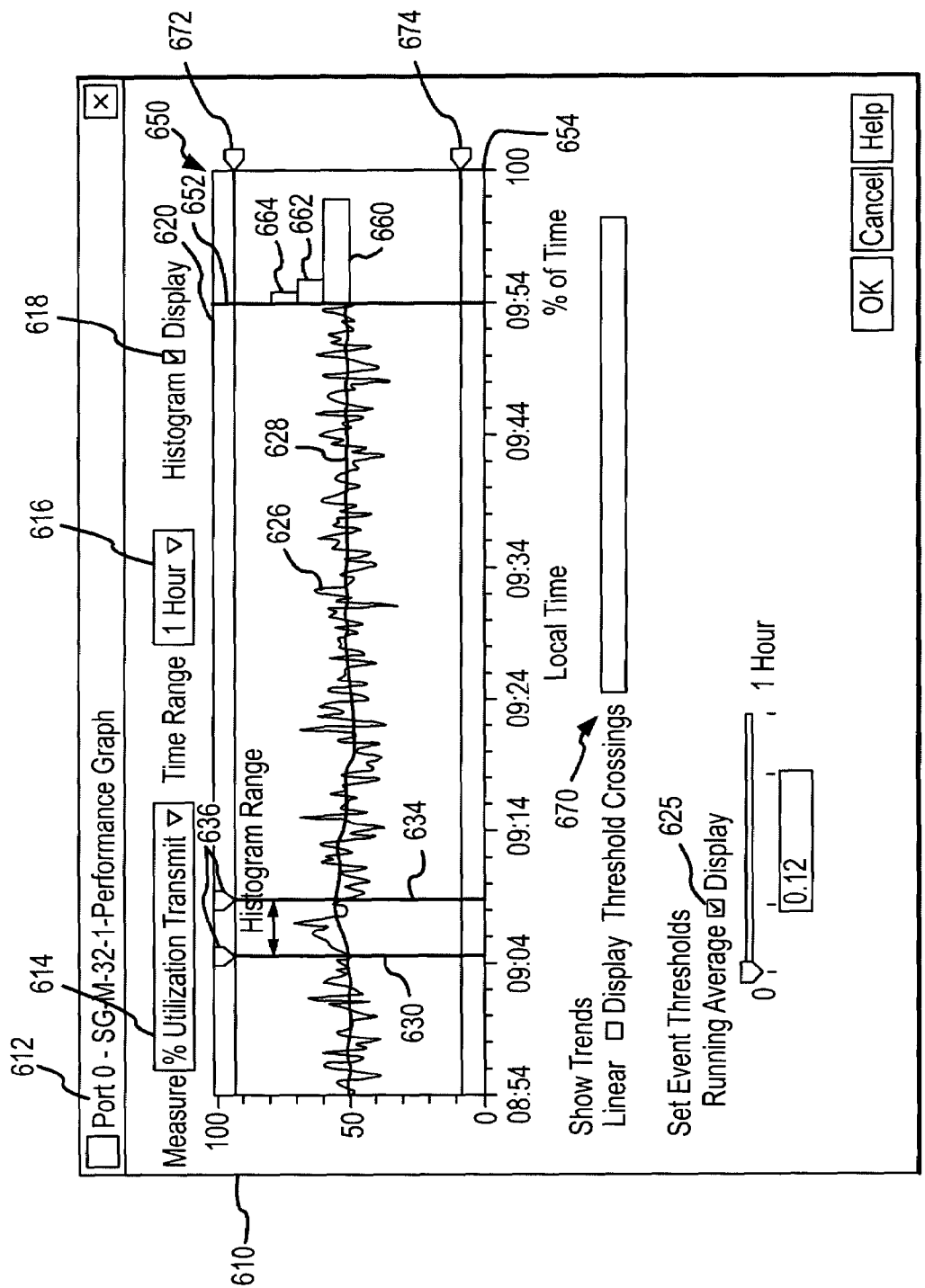
FIG. 6 illustrates another embodiment of a performance reporting display according to the invention in which a user has requested that a histogram be displayed concurrently with the real time data.

At 420, the user checks the box 518 and the report generator 128 acts to create a report or display in the user interface that includes a histogram for a histogram range established by a lower range point and a higher range point. FIG. 6 illustrates a screen shot 610 of the user interface 156 updated to show the network component 612, the parameter being reported 614, the time range 616, and that a histogram display is requested at 618. The performance report or display 620 shows a percent utilization on one axis and monitoring time along the other axis. The trace 626 again shows real time data points collected for the component 612. Additionally, the lower range point for the histogram is shown with vertical bar 630 and the higher range point for the histogram is shown with the vertical bar 634. This range is typically initially provided as a default. The user can than interact with the interface 610 by moving or dragging one or both of the bars 630, 634 with pointers (or the bars themselves in some cases) to a new location.

At 430, the report generator 128 acts to modify the display 610 to include the histogram 650 in the report display 620. While the histogram 650 may be positioned at numerous locations in the user interface 610, the histogram 650 is preferably placed, as shown, adjacent to trace of the corresponding data points being used to create the histogram 650. This allows the histogram 650 to provide an x-axis 652 that corresponds to the metric values on the y-axis of the metric report 620 portion, e.g., use the same ranges of metric values for bucket or metric value ranges in the histogram. The y-axis 654 can also overlap or extend the x-axis of the metric report 620 with modification to indicate the value being graphed, e.g., such as the percent of time that a metric value is occurring.

The report generator 128 functions to build the histogram 650 in response to the location of the bars 630, 634 and the values of the metric between the two bars 630, 634. In other words, the histogram 650 is built in real time based on the request at 618 and the values of the metric in the display 620 and in the histogram range indicated by the bars 630, 634 (i.e., the histogram range selector as in other cases the bars may be replaced by other selection devices). In other words, the report generator 128 determines the data points in the histogram range (corresponding to the trace 626) and creates the histogram bars 660, 662, 664, which are concurrently displayed with the corresponding or related trace 626. At 440 of FIG. 4, the report generator 128 monitors the bars 630, 634 and when they are moved, the report generator 128 functions to repeat step 430 to create a new histogram 650, which in practice is completed almost instantaneously such that as a bar 630, 634 is dragged the histogram 650 is modified to show the bars 660, 662, 664 corresponding to the newly selected histogram range. The user interface 610 further includes a selection box 625 that allows a user to choose to display a running average 628 in the report display 620, with the running average being calculated by the report generator 128 and displayed in the user interface 610. Box 670 can be used to display detected crossings of a lower and/or a higher threshold that may be selected by a user, such as with pointers 672, 674.

Referring again to FIG. 4, a user may change the time range such that the data is no longer real time data but is instead historic data that is stored in the histograms 140. For example, with reference to FIG. 7, the user via interface 710 may indicate a network component to monitor at 712, select a parameter or metric at 714 (shown as percent utilization), a histogram display at 718 (or optionally, a histogram does not need to be concurrently displayed), and at 716 a particular historic time frame for displaying or reporting performance data. The range selected at 716 (and at step 450 of the process 400 of FIG. 4) may be any useful time frame, but preferably matches the data files stored in the memory 140 such as a day, a week, a month, a year, or all permanent data that correspond to the day file 142, the week file 144, the month file 145, the year file 146, and the permanent file 148.

At 460, the report generator 128 builds the display 720 based on the historic time frame, for the network component, and the performance metric. Specifically, the display 720 is created by retrieving the data file in the built histograms 140 and creating a data point for each histogram in that file corresponding to the requested time frame to create the trace 726. For the illustrated example, the report generator 128 retrieves the histograms for the week selected (or default as the most recent week) and calculates an average value for each histogram in the week file 144 to form points at each time (such as each half hour if half hour histograms are provided in the file 144). However, each point in the trace 726 corresponds to a full histogram (e.g., a second level histogram). The report generator 128 uses the histogram information in the histogram range defined by the range selection bars 730, 734 to create the histogram 750 by combining the values for each included histogram or each histogram in the range defined by the bars 730, 734. Again, the histogram 750 is positioned with an x-axis parallel to the y-axis of the display 720 to reuse the metric values of that display and to overlap or extend the display's x-axis with its y-axis, which is relabeled as a "% of time."

Significantly, the histogram 750 has bars that do not appear to correspond to the values shown in the trace 726 between the selection bars 730, 734. This is because the trace 726 values are averages of a histogram while the histogram 750 shows each of the values found in each histogram represented by the trace 726 in the range defined by the bars 730, 734. Significantly, this technique allows an administrator to cull out peaks and valleys that are hidden in the averaged trace 726 by selecting a number of ranges with the bars 730, 734 to identify potential problems. For example, as shown, the histogram 750 includes numerous points indicating utilization was very high or near saturation over 20 percent of the time and was also very low a significant portion of the time. Without the use of the histogram 750, it would be difficult to accurately understand or monitor the network component. In this manner, averaging is combined with the use of stored histogram data to retain, performance data that otherwise would be lost or averaged out.

In the illustrated embodiment, these highs and lows are further identified by use of threshold crossings box 770, which provides timing of when a metric threshold was crossed. The metric or parameter thresholds are displayed at 771 and, in this case, the four thresholds can be set with pointers 772, 774, 776, and 778. The user interface 710 further includes a selection box 780 for requesting display of trend line 784 for the displayed trace 726.

Referring to FIG. 4, at 470 the report generator 128 monitors the user interface 156 and when the range selector, i.e., one or both of the bars 730, 734, are moved, a new histogram is built and displayed in the user interface 156. If not the process 400 continues (such as by repeating the monitoring 470 or receiving a differing request from the user) or ends at 490 (such as when the user selects the cancel or close buttons of the interface 156. A new user interface 810 is shown to be built in FIG. 8. As shown, the user interface 810 includes a component identifier 812, a parameter or metric selection (here shown as Response in milliseconds) 814, a duration or period of monitoring (e.g., one day, which defaults to the most recent day but may, at least in some embodiments, be a particular day selected by the user) 816, and a request at 818 for a histogram display. The metric display 820 includes a trace for the selected device for the time period, i.e., a day. The user has selected a histogram range by moving the pointer 836 such that the bars 830, 834 overlap or select a single point in the trace 826. Such a selection is useful for demonstrating that each point in the trace 826 is created by averaging the data points in a histogram but still relate directly to the histogram whose data points are not deleted or lost when the trace 826 is formed.

Figure 7:
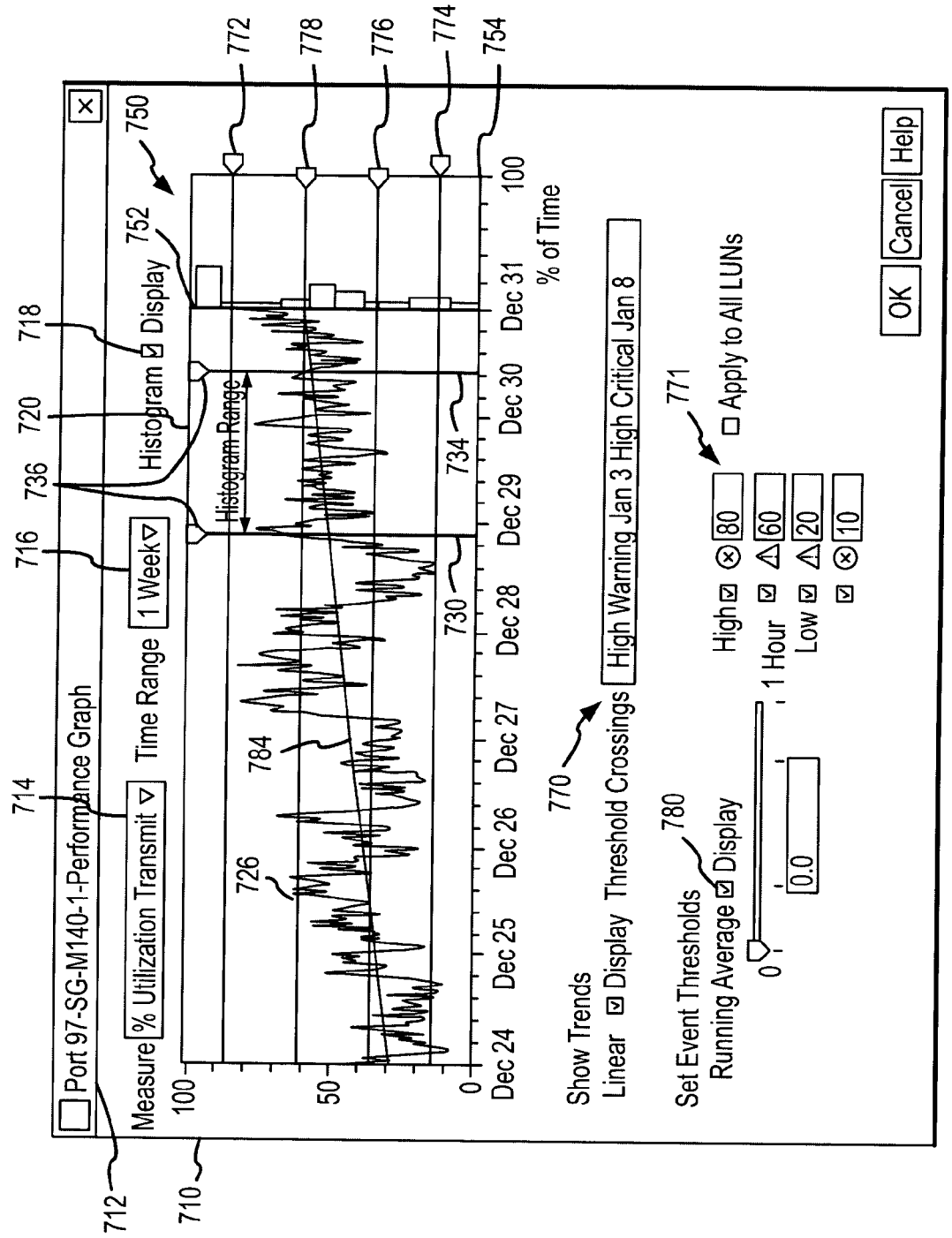
FIG. 7 illustrates yet another embodiment of a performance reporting display in which the time range for data display has been increased such that all data being displayed is historic with a histogram also being displayed for a selected range.
Figure 8:
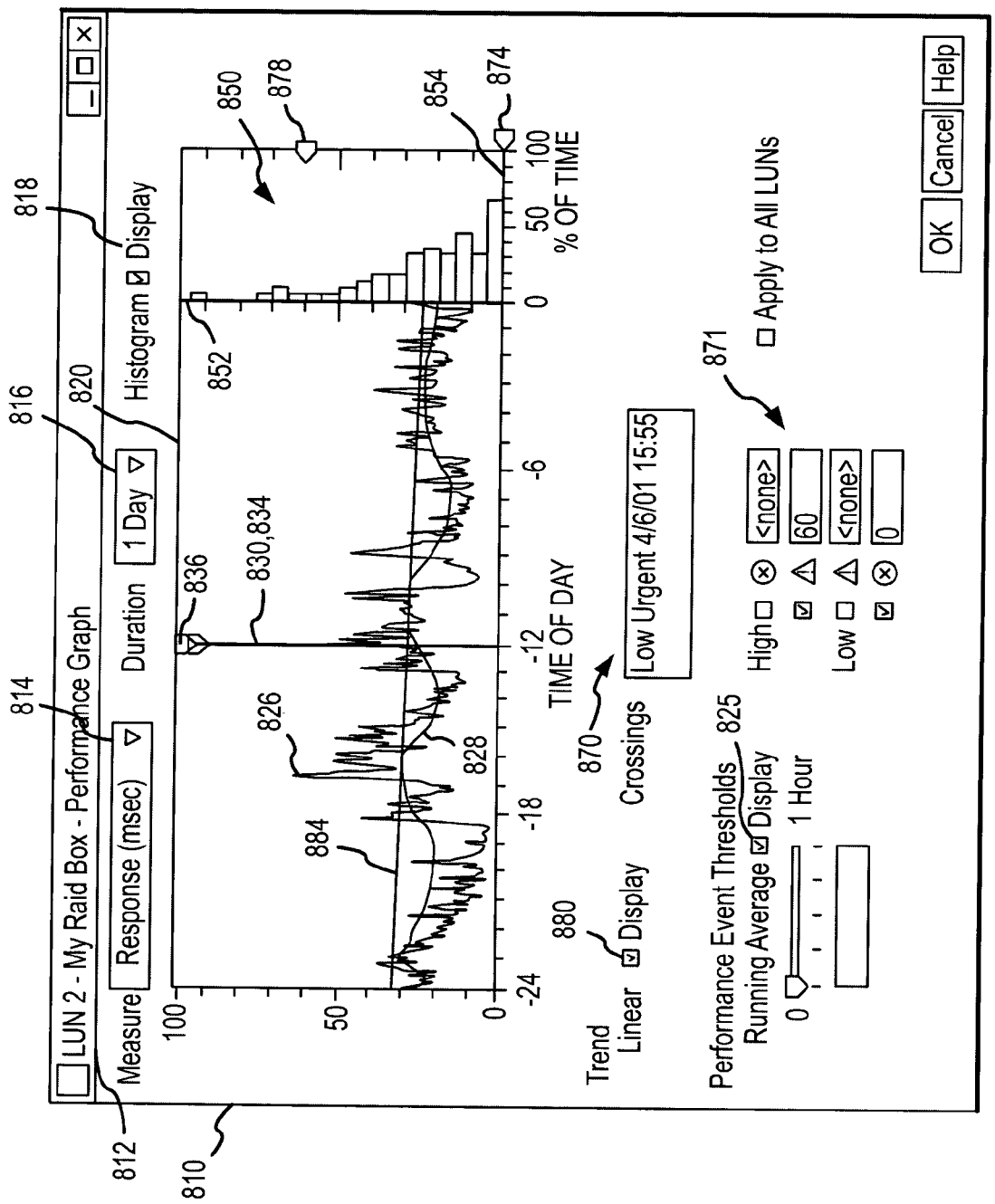
FIG. 8 illustrates the performance reporting display of FIG. 7 after it has been modified to indicate that the selected histogram range is a single data point, which results in the stored histogram for that point in time being displayed along with the trace of performance data.

Referring to FIG. 8, the histogram 850 is displayed by the report generator 128 based on the histogram in built histograms 141 in memory structure 140 (which in this case would be a first level histogram such as a 5 or 15 minute histogram for the network component 812). Again, the histogram 850 has an x-axis 852 parallel to the y-axis of the display 820 with similar divisions (or buckets) and units and a y-axis 854 that extends the x-axis of display 820 with differing units, e.g., percent of time a component has a performance value in a particular range. As indicated in FIGS. 7 and 8, the histogram data is retained in the memory 140 and is readily retrievable by the report generator 128 for creating histograms, whether the histogram 750 is a combination of a plurality of histograms in the selected histogram range or the histogram 850 is a single histogram as the range is a single point on the trace 826.

FIG. 8 further illustrates that the report generator 128 can be used to calculate and display trends 884 with selection at trend box 880. By selecting at 825, the user may also cause the report generator 128 to calculate for the trace 826 values a running average 828 that is included in the display 820. Thresholds are indicated at 871 and set by moving pointers 874, 878 (or entering information in boxes at 871), with crossings of set thresholds being identified by the report generator 128 and displayed at box 870.

The above disclosure sets forth a number of embodiments of the present invention. Other arrangements or embodiments, not precisely set forth, could be practiced under the teachings of the present invention and as set forth in the following claims. For example, the location of the histogram in a user interface relative to other displayed performance information is not considered limiting to the invention as the histogram could be displayed as another graph above or below the other display or could be incorporated into the display, such as by placing it on a line between the range selector bars. The method of selecting the histogram ranges may also be altered to practice the invention, such modifications may include entering numeric values in text boxes or selecting values from pull down menus. In one embodiment (not shown), the range of the trace of the performance data is highlighted to indicate the range selected, such as by displaying the selected and unselected trace in differing colors.

We claim:

1. A computer-based method for reporting data network monitoring information, comprising:
   accessing a set of performance metric values for a network component;
   generating a trace comprising graph data points based on the performance metric values;
   for a selected histogram range of the trace, building a histogram corresponding to the graph data points; and
   for a user interface, generating a performance monitoring display concurrently including a graph of the trace relative to an x-axis and a y-axis and a representation of the histogram, wherein the performance metric values are values discovered for the network component or derived from the discovered values and the y-axis of the graphed trace includes ranges of values for the performance metric values and the histogram building includes reusing the ranges of values as metric value ranges for the histogram.

2. The method of claim 1, wherein the histogram and the trace graph are adjacent with the x-axis of the histogram being parallel to the y-axis of the trace graph.

3. The method of claim 2, further including in the user interface displaying a selection mechanism movable by a user of the user interface to define the selected histogram range.

4. A computer-based method for reporting data network monitoring information, comprising:
   accessing a set of performance metric values for a network component generating a trace comprising graph data points based on the performance metric values;
   for a selected histogram range of the trace, building a histogram corresponding to the graph data points; and
   for a user interface, generating a performance monitoring display concurrently including a graph of the trace relative to an x-axis and a y-axis and a representation of the histogram, wherein each of the graph data points in the trace corresponds to a histogram built from the performance metric values and the trace is generated by determining and plotting an average value of each of the graph data point histograms.

5. The method of claim 4, wherein the performance metric values are values discovered for the network component or derived from the discovered values.

6. The method of claim 4, wherein the building of the histogram for the performance monitoring display includes combining the graph data point histograms corresponding to the graph data points in the selected histogram range.

7. The method of claim 6, further including receiving a time period from a user, and wherein the accessing includes retrieving the set of performance metric values for the received time period.

8. A user interface for a computer monitor, comprising:
a first graphical representation plotting a trace relative to an x-axis and a y-axis, the trace comprising a plurality of data points representing a network performance metric for a network component, wherein the first graphical representation includes a histogram range selector defining a subset of the trace; and
a second graphical representation illustrating a histogram corresponding to a set of the data points in the subset of the trace defined by the histogram range selector, wherein the data points in the trace are averages determined by processing previously built histograms for the network performance metric for the network component corresponding to the data points.

9. The user interface of claim 8, wherein the histogram range selector is adjustable by a user of the user interface to redefine the subset of the trace used to define the histogram.

10. The user interface of claim 8, wherein the histogram of the second graphical representation comprises a collection of the previously built histograms corresponding to the data points in the subset of the trace.

11. The user interface of claim 8, wherein the histogram of the second graphical representation includes an x-axis parallel to the y-axis of the first graphical representation with matching value divisions.

12. The user interface of claim 8, wherein the first graphical representation includes a trend line illustrating a trend calculated for the data points of the trace.

13. The user interface of claim 8, wherein the first graphical representation includes a running average line illustrating a running average calculated for the data points of the trace.

14. A computer program product for use with a graphics display device, comprising:
a computer readable program code means for causing a computer to access a set of performance metric values for a network component;
a computer readable program code means for causing a computer to generate a trace comprising graph data points based on the performance metric values;
a computer readable program code means for causing a computer for a selected histogram range of the trace to build a histogram corresponding to the graph data points; and
a computer readable program code means for causing a computer to generate for a user interface a performance monitoring display including a graph of the trace relative to an x-axis and a y-axis and a representation of the histogram;
wherein each of the graph data points in the trace corresponds to a histogram built from the performance metric values and the trace is generated by determining and plotting an average value of each of the graph data point histograms.

15. The computer program product of claim 14, wherein the histogram and the trace graph are adjacent with the x-axis of the histogram being parallel to the y-axis of the trace graph.

* * * * *